United States Patent [19]
Pflueger et al.

[11] 4,037,563
[45] July 26, 1977

[54] AQUARIUM VIEWING WINDOW

[75] Inventors: John M. Pflueger; William A. Hutcheson, both of San Francisco, Calif.

[73] Assignee: John M. Pflueger, San Francisco, Calif.

[21] Appl. No.: 671,536

[22] Filed: Mar. 29, 1976

[51] Int. Cl.² .............................................. A01K 64/00
[52] U.S. Cl. ......................................... 119/5; 52/208
[58] Field of Search ............... 119/5; 114/66; 52/169, 52/208; 4/172, 172.14, 172.19

[56] References Cited
U.S. PATENT DOCUMENTS 2,613,402  10/1952  Gouge ................................... 52/208
3,254,621  6/1966  White .................................... 114/66

Primary Examiner—Hugh R. Chamblee
Attorney, Agent, or Firm—Townsend and Townsend

[57] ABSTRACT

A viewing window structure for an aquarium tank and the like includes a removable water pressure resistive viewing panel which presents a substantially uniform water-tight face to the water side thereof. The window structure comprises supporting seat means embedded in a tank wall adapted to receive the water encountering viewing panel. A flange of the supporting seat means is operative to sealably confront the water side of the window panel and to provide a substantially flush water-tight seal. Pressure retaining frame means and supporting hardware are provided on the dry side of the window panel.

9 Claims, 2 Drawing Figures

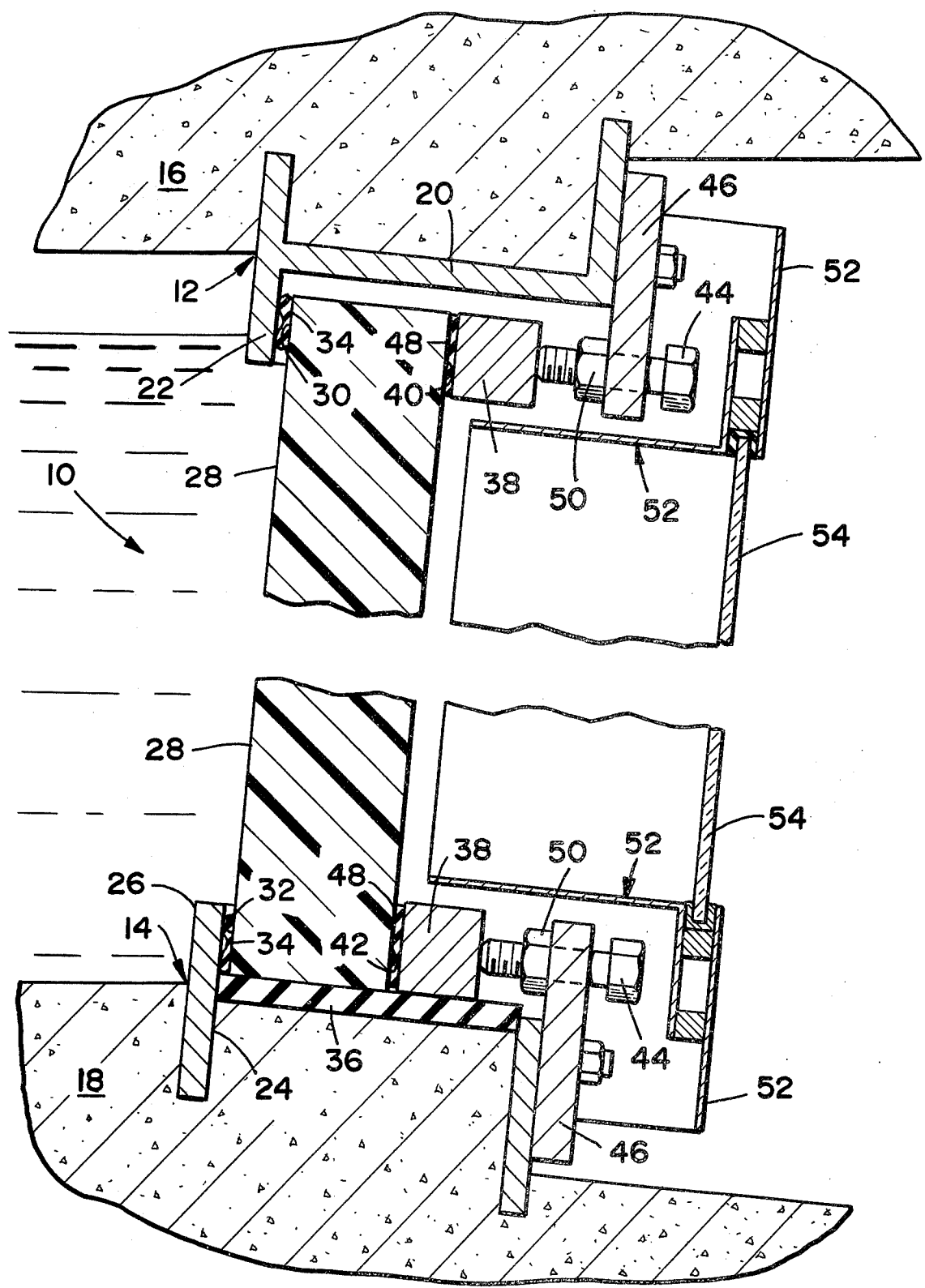
FIG_1

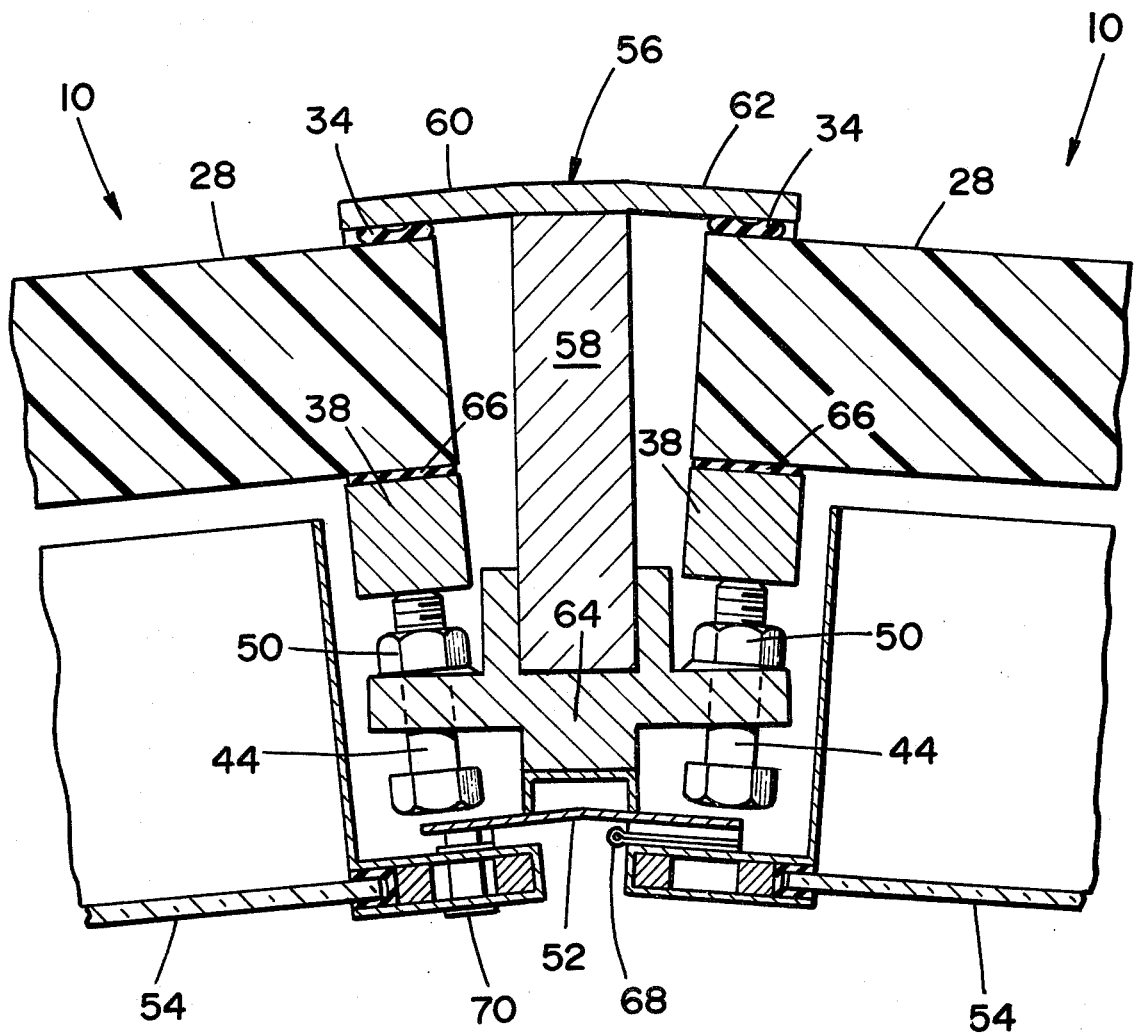
FIG _ 2

AQUARIUM VIEWING WINDOW

BACKGROUND OF THE INVENTION

1. Field of the Invention

This invention relates to water-tight windows and particularly to removable viewing windows for large aquarium tanks.

2. Description of the Prior Art

Previous known aquarium and nautical viewing windows have maintained a reliable water-tight seal by providing a supporting seat against which the viewing panel is pressed by water pressure. A fixed frame holding the water-confronting panel against the substantial water pressure necessitates the use of support brackets and other mounting hardware on the inner or water side of the water confronting panel. The mounting hardware and associated brackets are thereby typically exposed to water, which results in corrosion and accumulation of waterborne substances such as contaminants and algae growth, particularly along the head, the still and in the voids of the mullions between viewing panels. Due to surface and shape irregularities of sucnh water-exposed hardware around the frame, it is difficult to clean and maintain the viewing panels, particularly around the borders, and to maintain clear, healthy tank water. The maintenance problem may be annoying ad substantial, threatening both clarity of viewing and the health of the aquatic life. Alternatively, a caulking or filler material might be employed to fill the voids between panel borders. However, suitable materials are difficult to apply in necessarily large quantities and to maintain. Therefore, filler materials are generally avoided.

It is therefore desirable to provide an aquarium window with a highly reliable water-tight seal with minimal mounting or adjustment hardware exposed to aquarium water and which is adapted for relative ease of maintenance.

SUMMARY OF THE INVENTION

According to the invention, a viewing window structure for an aquarium tank and the like is provided which includes a removable water pressure resistive viewing panl presenting a substantially uniform water-tight face to the water side thereof. The window structure comprises supporting seat means embedded in the tank wall and adapted to receive the water-pressure resistive viewing panel. A flange of the supporting seat is provided which is operative to sealably confront the water side of the window panel and to provide a substantially flush water-tight seal. Pressure-retaining frame means and supporting hardware are provided on the dry side of the window panel.

In the preferred embodiment, the pressure-retaining-hardware includes adjustments bolts and a bar frame which urge the window panel into sealable contact with the flange and associated sealing gaskets. The water pressure is operative to urge the viewing panel into suitable contact with the bar frame. Means may be provided for covering the adjustment hardware and for protecting the dry side of the water-confronting window panel. For example, the hardware along the mullion, the head, and the sill may be shrouded by a molding defining a viewing frame. Further, a second panel, for instance of tempered glass, may be set into the viewing frame, providing an air space between the confronting window and the viewer. Hinge means may be provided for the viewing frame permitting the second panel to be opened to allow access to the normally shrouded hardware.

This invention has a particular advantage in that the adjustment hardware and frame means are relatively accessible for servicing and cleaning. Furthermore, since the water-confronting face presents a minimum of protruding structure upon which undesirable -contaminants may accumulate, the water-confronting face is readily cleaned and serviced. As a further advantage, water pressure on the viewing panel is operative to urge sealable contact between the bar frame and the dry side of the panel. Adjustment means may be readily employed to compensate for irregularities in the panel and to assure the uniform water-tight seal.

Unlike sealant-type joints utilizing caulking, the present invention permits compression-type gasket sealing, which may be readily adjustable, particularly while the tank is filled. In this manner, incipient leaks can be readily detected and corrected.

The aquarium window according to this invention also permits easier installation and removal of the water-confronting panel. Furthermore, a double glazed viewing window increases security and minimizes the dangers of vandalism. Double glazing also permits air to flow freely between the panel to minimize the possibility of condensation on the dry side of the water-confronting panel.

Further advantages of the invention will be evident from the following detailed description of specific embodiments.

BRIEF DESCRIPTION OF THE FIGURES

The invention may be best understood by reference to the detailed description of specific embodiments in conjunction with the accompanying figures in which:

FIG. 1 is a vertical cross sectional view of the viewing window illustrating the head and the sill; and FIG. 2 is a horizontal cross sectional view illusrating the mullion.

DETAILED DESCRIPTION OF SPECIFIC EMBODIMENT

The invention provides a water-tight aquarium viewing window which minimizes maintenance and service requirements. Referring to FIG. 1, there is shown in cross section a tank fenestration or viewing window 10 having a window head 12 and a window sill 14. The head 12 and the sill 14 may be the margin of concrete walls 16 and 18 bordering the upper and lower sides respectively of a viewing area.

Embedded in the concrete head 16 is an upper panel supporting seat 20 which includes a flange 22 extending downwardly. Similarly, a lower panel supporting seat 24 is embedded in the sill 14 and includes an upwardly extending flange 26. The panel supporting seat 20 and 24 may be of a high-strength corrosion-resistive material such as stainless steel.

A transparent viewing panel 28, which may be of acrylic plexiglass, suitable transparent material capable of bearing a substantial distributed pressure load, is disposed so that the water side of the upper edge 30 and lower edge 32 are juxtaposed to the downwardly extending flange 22 and the upwardly extending flange 26, respectively. A sealing gasket 34 may be interposed between the panel edges 30 and 32 and the respective flanges 22 and 26, extending along the full periphery of viewing panel 28.

In the preferred embodiment, this sealing gasket 34 may be of a silicone rubber having a Shore A Durometer hardness of approximately 50. Alternatively, a chemical sealant may be interposed between the flanges 22 and 26 and the water facing edges 30 and 32.

The faces of the upwardly extending flange 26 and the downwardly extending flange 22 confronting the plexiglass panel 28 must lie in substantially the same plane to minimize the possibility of inferior sealing therebetween. In particular, the plane defined by the flanges 22 and 26 should not deviate from a true plane by more than about one-quarter inch for a flange separation of four feet, and preferably the deviation should not exceed one-eighth inch for that separation distance.

In order to permit some expansion of the plexiglass panel 28 and to facilitate air circulation and access in case of necessary removal, a space is provided above the edge 30 of the plexiglass panel 28. In addition, the panel may rest on a pad 36, such as a rubber strip, on the sill 14.

In order to hold the plexiglass panel 28 in place, a bar frame 38 is provided along upper and lower edges 40 and 42 of the plexiglass panel dry side. The bar frame 38 is secured against the panel 28 by a plurality of compression pins or bolts 44 spaced along the length of the bar frame 28. The compression bolts 44 may be secured to the head 12 and the sill 14 by mounting brackets 46 suitable for carrying the horizontal load of the water and the panel 28. A cushion gasket 48 may be provided between the bar frame 38 segments and the plexiglass panel 28. In the preferred embodimemt, the cushion gasket 48 may be silicone rubber with a Shore A Durometer hardness of about 75–80.

The compression bolts 44 may be adjustable to compensate for some deviation in panel surface contour and to achieve uniform compression under water pressure. For this purpose, each compression bolt 44 may be provided with a retainingg nut 50.

The mounting hardware, including the mounting bolts 44 and nuts 50 may be protected against tampering and hidden from view by an outer window frame 52 supporting a tempered plate glass covering 54. This minimizes the possibility of scratches and other damage to the water-confronting viewing panel 28. The outer window frame 52 is preferably spaced from the bar frame 38 the brackets 46 and viewing panel 28 sufficient to permit air circulation between the glass covering 54 and the viewing panel 28,in order to minimize the possibility of condensation on the viewing surfaces.

FIG. 2 shows the mullion 56 of adjoining viewing windows 10 which illustrates many of the features shown in FIG. 1. The mullion 56 comprises a vertical strut 58 having laterally projecting flanges 60 and 62 disposed to be parallel with the viewing panels 28. Sealing gaskets 34 are provided between the viewing panels 28 and the flanges 60 and 62. Bar frame segments 38 are secured by compression bolts 44 mounted in a laterally extending support bracket 64 fixed to the strut 58. Cushion gaskets 66 may be interposed between the viewing panels 28 and bar frames 38 as previously described.

The outer window frame 52 with the glass covering pane 54 may be provided with hinge means 68 and locking latch means 70. This permits ready and convenient access to the protected hardware between the panel 28 and covering 54 while providing security against tampering.

An aquarium viewing window according to the preferred embodiment of the invention has been described. Many modifications thereof are possible. The invention, therefore, is not to be restricted except as is necessitated by the prior art and as indicated by the appended claims.

What is claimed is

1. An aquarium tank viewing window having at least one fenestration comprising:
   a water pressure resistive transparent viewing panel having a dry side and an opposing water side;
   flange means along the margin of said fenestration protruding inwardly in a common plane operative to comfront said water side adjacent the margins of said viewing panel in a substantially flush fitting joint;
   bar frame means operative to confront said dry side adjacent the margins of said viewing panels;
   means supporting said bar frame against said dry side for maintaning a water-tight seal between said flange means and said water said;
   means shrouding said bar frame means and said bar frame supporting means and a second viewing panel mounted in said shrouding means for protecting an area between said water pressure resistive viewing panel and said second viewing panel;
   means hinging said shroud means to said fenestration for permitting ready access to said protected area; and
   means for locing said shrouding means to said fenestration for preventing unauthorized access to said protected area.

2. A viewing window for an aquarium tank having at least one fenestration comprising:
   a unitary water-pressure resistive transparent viewing panel having a viewing side and an opposing submersible side;
   said panel being capable of bearing a substantial distributed pressure load on the surface of said submersible side and an equal opposing load along the periphery of said viewing side;
   a lateral load bearing flange circumscribing the margin of said fenestration having one side confronting the periphery of said submersible side and an opposing side with a substantially uniformly smooth surface;
   means interposed between said flange means and said submersible side periphery for sealing said fenestration to said viewing panel;
   adjustable bracing means along said viewing side periphery for supporting said unitary viewing panel; and
   means for urging said bracing means against said viewing side periphery thereby to maintain said sealing means in water-tight seal along said submersible side periphery.

3. An aquarium viewing window according to claim 2 wherein said flange means varies from a plane parallel to said viewing panel by less than ¼-inch per four feet of panel surface linear dimension.

4. An aquarium viewing window according to claim 3 wherein said viewing panel is plexiglass.

5. An aquarium viewing window according to claim 3 wherein said flange means is substantially flush with and parallel to said submersible side for inhibiting accumulation of contaminants.

6. An aquarium viewing panel according to claim 5 further including a cushion gasket between said bracing means and said viewing side.

7. An aquarium tank viewing window according to claim 6 wherein said means for urging said bracing means against said viewing side periphery comprises a plurality of bolts compressible against said bracing means.

8. An aquarium tank viewing window according to claim 2 further comprising means for protecting said water pressure resistive viewing panel, said viewing panel protecting means comprising means for shrouding the periphery of said fenestration including said bracing means; a second viewing panel mounted to said shrouding means for enclosing an area between said water pressure resistive panel said second viewing panel; and hinge means mounting said viewing panel protecting means to said fenestration.

9. An aquarium tank viewing window according to claim 2 wherein said sealing means comprises a compression-type gasket seal.

* * * * *